US009346194B2

(12) United States Patent
Morgan et al.

(10) Patent No.: US 9,346,194 B2
(45) Date of Patent: *May 24, 2016

(54) COLORED CONTACT LENSES AND METHOD OF MAKING THE SAME

(71) Applicant: Novartis AG, Basel (CH)

(72) Inventors: Courtney Flem Morgan, Alpharetta, GA (US); Sandra Corti, Suwanee, GA (US)

(73) Assignee: NOVARTIS AG (CH)

( * ) Notice: Subject to any disclaimer, the term of this patent is extended or adjusted under 35 U.S.C. 154(b) by 659 days.

This patent is subject to a terminal disclaimer.

(21) Appl. No.: 13/713,453

(22) Filed: Dec. 13, 2012

(65) Prior Publication Data

US 2013/0175721 A1    Jul. 11, 2013

Related U.S. Application Data

(60) Provisional application No. 61/582,279, filed on Dec. 31, 2011.

(51) Int. Cl.
*B29C 35/08*    (2006.01)
*B29D 11/00*    (2006.01)
*B29C 37/00*    (2006.01)

(52) U.S. Cl.
CPC ............. *B29C 35/08* (2013.01); *B29C 37/0032* (2013.01); *B29D 11/00038* (2013.01); *B29D 11/00903* (2013.01); *B29C 2035/0827* (2013.01); *B29C 2037/0046* (2013.01)

(58) Field of Classification Search
CPC .................. B29D 11/00038; B29D 11/00903; B29C 2035/0827; B29C 37/0032; B29C 35/08
USPC .................................................. 264/494, 496
See application file for complete search history.

(56) References Cited

U.S. PATENT DOCUMENTS

| | | | |
|---|---|---|---|
| 3,536,386 A | 10/1970 | Spivack | |
| 4,536,554 A | 8/1985 | Lim | |
| 4,582,402 A | 4/1986 | Knapp | |
| 4,668,240 A | 5/1987 | Loshaek | |
| 4,704,017 A | 11/1987 | Knapp | |
| 4,857,072 A | 8/1989 | Narducy | |
| 4,983,702 A | 1/1991 | Mueller | |
| 5,034,166 A | 7/1991 | Rawlings | |
| 5,087,392 A | 2/1992 | Burke | |
| 5,272,010 A | 12/1993 | Quinn | |
| 5,362,767 A | 11/1994 | Herbrechtsmeier | |
| 5,391,589 A | 2/1995 | Kiguchi | |
| 5,414,477 A | 5/1995 | Jahnke | |
| 5,555,504 A | 9/1996 | Lepper | |
| 5,597,519 A | 1/1997 | Martin | |
| 5,656,210 A | 8/1997 | Hill | |
| 5,681,510 A | 10/1997 | Valint, Jr. | |
| 5,760,100 A | 6/1998 | Nicolson | |
| 5,894,002 A | 4/1999 | Boneberger | |
| 6,113,817 A | 9/2000 | Herbrechtsmeier | |
| 6,737,661 B2 | 5/2004 | Kelly | |
| 7,550,519 B2 | 6/2009 | Phelan | |
| 8,147,728 B2 | 4/2012 | Quinn | |
| 2002/0145211 A1 | 10/2002 | Pegram | |
| 2003/0054109 A1 | 3/2003 | Quinn | |
| 2003/0090014 A1 | 5/2003 | Heinrich | |
| 2003/0163196 A1 | 8/2003 | Rothaug | |
| 2004/0044099 A1 | 3/2004 | Tucker | |
| 2005/0218536 A1 | 10/2005 | Quinn | |
| 2006/0126016 A1* | 6/2006 | Yokoyama | B29C 33/428 351/159.69 |
| 2007/0035050 A1* | 2/2007 | Rogers | B29D 11/00134 264/1.32 |
| 2008/0073804 A1 | 3/2008 | Matsuzawa | |
| 2008/0150178 A1* | 6/2008 | Aguado | B29D 11/00125 264/1.38 |
| 2008/0217800 A1* | 9/2008 | Kernick | B29D 11/00192 264/1.38 |
| 2009/0230575 A1* | 9/2009 | Liu | B29C 33/40 264/1.1 |

FOREIGN PATENT DOCUMENTS

EP    1078732 A2    2/2001
WO    9611782 A1    4/1996

OTHER PUBLICATIONS

PCT International Search Report dated Mar. 8, 2013, International Application No. PCT/US2012/069452, International Filing Date Dec. 13, 2012.
PCT Written Opinion of the International Searching Authority dated Mar. 8, 2013, International Application No. PCT/US2012/069452, International Filing Date Dec. 13, 2012.

* cited by examiner

*Primary Examiner* — Christopher Schatz
(74) *Attorney, Agent, or Firm* — Sheng-Hsin Hu

(57) ABSTRACT

The present invention generally relates to a method for making colored contact lenses, in particular to colored silicone hydrogel contact lenses. The present invention is also related to a method of a first high intensity UV curing the colored print on the mold and a second high intensity UV treating mold for making colored silicone hydrogel contact lenses. The present invention illustrates the right combination of the first high intensity UV exposure and the second high intensity UV exposure allows a lens that maintains good ion permeability (IP) value and a good print quality.

12 Claims, No Drawings

COLORED CONTACT LENSES AND METHOD OF MAKING THE SAME

This application claims the benefit under 35 USC §119 (e) of U.S. provisional application Ser. No. 61/582,279 filed Dec. 31, 2011, incorporated herein by reference in its entirety.

The present invention is related to a method for making colored contact lenses, in particular to colored silicone hydrogel contact lenses. The present invention is also related to a method of high intensity UV curing the colored print on the mold and high intensity UV treating mold for making colored silicone hydrogel contact lenses.

BACKGROUND

For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, security mark and the like, which are of benefits to wearers, eye-care practitioners and manufacturers.

Various methods have been disclosed to make colored non-silicone hydrogel contact lenses (see, for example, disclosed in U.S. Pat. Nos. 4,668,240, 4,857,072, 5,272,010, and 5,414,477 and U.S. Patent Application publication Nos. 2003/0054109 and 2004/0044099, all of which are incorporated herein by reference). Commercially available colored contact lenses are prepared from non-silicone hydrogel material, such as, for example, a hydroxyethylmethacrylate (HEMA)-based hydrogel (i.e., a copolymer of HEMA with other comonomers and/or crosslinkers). Those non-silicone hydrogel lenses generally do not have high oxygen permeability. It is known that contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels into the cornea. Hydrogel contact lenses conform closely to the shape of the eye, so oxygen cannot easily circumvent the lens. Thus, hydrogel contact lenses must allow oxygen to diffuse through the lens to reach the cornea, namely having relatively high oxygen transmissibility (i.e., oxygen permeability over the lens thickness) from the outer surface to the inner surface to allow sufficient oxygen permeate through the lens to the cornea and to have minimal adverse effects on corneal health. In addition, ion permeability is critical for healthy contact lens wear for silicone hydrogel contact lenses since the tear layer on both sides of the lens behavior as a dilute salt solution. Lenses with appropriate levels of ion permeability are generally characterized as being required for acceptable clinical performance, such as for example on eye movement, which is especially important in the case of silicone hydrogels.

In recent years, silicone hydrogel contact lenses, for example, Focus NIGHT & DAY™ (CIBA VISION), become more and more popular because of corneal health benefits provided by their high oxygen permeability and comfort. However, few methods have been developed for making colored silicone hydrogels contact lenses, in particular, which has good quality of the finished lens' printed pattern.

Therefore, there are needs for a method for making colored silicone hydrogel contact lenses with high ion permeability, high oxygen permeability and a high-quality color image.

SUMMARY OF THE INVENTION

The present invention provides a method of making colored silicone-hydrogel contact lenses, comprising the steps of:

a) providing a mold assembly comprising a female mold half having a molding surface and a male mold half having a molding surface;

b) applying at least one color coat to at least a portion of at least one of the female molding surface and the male molding surface with an ink, wherein the ink comprises at least one colorant and a silicone-containing polymer binder;

c) irradiating the color coat on the molding surface with a first high intensity UV light to at least partially cure the color coat; and then d) irradiating the exposed surfaces of the female mold and the male mold with a second high intensity UV light prior to;

e) filling a lens-forming fluid material comprising at least one silicone-containing vinylic monomer or macromer and at least one hydrophilic vinylic monomer into the irradiated mold assembly from step d);

f) exposing the mold assembly and the lens-forming fluid material to an energy source, wherein the energy source polymerizes the lens-forming fluid material;

wherein emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "contact lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically, a contact lens has an anterior surface and an opposite posterior surface and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon.

A "color image" is intended to describe a cosmetic pattern (e.g., iris-like patterns, Wild Eye™ patterns, made-to-order (MTO) patterns, and the like), an inversion mark that allows a user to handle and insert easily a contact lens, and/or contact lenses stock keeping units (SKUs) either in print forms of numbers or as bar codes. A color image can be a single color image or a multi-color image. A color image is preferably a digital image, but it can also be an analog image.

A "colored coat" refers to a coating on an object and having a color image printed therein.

A "colorant" means either a dye or a pigment or a mixture thereof that is used to print a color image on an article.

"Dye" means a substance that is soluble in a solvent and that is used to impart color. Dyes are typically translucent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

A "pigment" means a powdered substance that is suspended in a liquid in which it is insoluble. Pigments are used to impart color. Pigments, in general, are more opaque than dyes.

The term "a pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "lens-forming material" refers to a polymerizable composition (or formulation) which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrophilic vinylic monomer", as used herein, refers to a vinylic monomer which is capable of forming a homopolymer that can absorb at least 10 percent by weight water when fully hydrated.

A "hydrophobic vinylic monomer", as used herein, refers to a vinylic monomer which is capable of forming a homopolymer that can absorb less than 10 percent by weight water when fully hydrated.

A "macromer" refers to a medium to high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

"Molecular weight" of a polymeric material (including monomeric or macromeric materials), as used herein, refers to the number-average molecular weight unless otherwise specifically noted or unless testing conditions indicate otherwise.

A "polymer" means a material formed by polymerizing/crosslinking one or more monomers, macromers and or oligomers.

"A binder polymer" refers to a crosslinkable polymer that can be crosslinked by a crosslinker or upon initiation by a chemical or physical means (e.g., moisture, heating, UV irradiation or the like) to trap or bind colorants onto or into a medical device (preferably a contact lens) such as that term is known in the art.

A "photoinitiator" refers to a chemical that initiates radical crosslinking and/or polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, Irgacure® 4265 and Irgacure® 2959. Azo type initiators [e.g. 2,2'-azobis(2,4-dimethylpentanenitrile), 2,2'-azobis(2-methylpropanenitrile), 2,2'-azobis(2-methylbutanenitrile)] can be use as photo or thermal initiators.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

The term "fluid" as used herein indicates that a material is capable of flowing like a liquid.

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3\ oxygen)/(cm^2)(sec)(mm^2Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3\ oxygen)(mm)/(cm^2)(sec)(mm^2Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm).

The "ion permeability" through a lens correlates with the Ionoflux Diffusion Coefficient. The Ionoflux Diffusion Coefficient, D, is determined by applying Fick's law as follows:

$$D = -n'/(A \times dc/dx)$$

where n'=rate of ion transport [mol/min]
A=area of lens exposed [mm$^2$]
D=Ionoflux Diffusion Coefficient [mm$^2$/min]
dc=concentration difference [mol/L]
dx=thickness of lens [mm]

An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

The term "molding surface with optical quality" in reference to molding surface defines one of the posterior and anterior surfaces of a contact lens. After demolding from the mold, the contact lens has a optically finished surfaces corresponding to one of the anterior and posterior surfaces of a contact lens. The term "optically finished" in reference to a surface or a zone in a surface refers to a surface of a contact lens or a zone in a surface of a contact lens, wherein the surface or zone does not need to undergo further processing, e.g., such as, polishing or lathing.

The "an exposed surfaces of the mold" refers, in this invention, to the optical quality molding surfaces have or have not color coat on the surfaces. When the optical quality molding surfaces have no color coat on the surfaces, the UV light could directly radiate on the molding surface. When the optical quality molding surfaces have a color coat on the surfaces, the UV light could penetrate the color coat and then radiate on the molding surface.

The present invention is generally directed to a method for making colored silicone hydrogel contact lenses with high ion permeability, high oxygen permeability and a high-quality color image. The invention is related to a method of making colored silicone-hydrogel contact lenses, comprising the steps of:

a) providing a mold assembly comprising a female mold half having a molding surface and a male mold half having a molding surface;

b) applying at least one color coat to at least a portion of at least one of the female molding surface and the male molding surface with an ink, wherein the ink comprises at least one colorant and a silicone-containing polymer binder;

c) irradiating the color coat on the molding surface with a first high intensity UV light to at least partially cure the color coat;

d) irradiating the exposed surfaces of the female mold and the male mold with a second high intensity UV light prior to;

e) filling a lens-forming fluid material comprising at least one silicone-containing vinylic monomer or macromer and at least one hydrophilic vinylic monomer into the irradiated mold assembly from step d);

f) exposing the mold assembly and the lens-forming fluid material to an energy source, wherein the energy source polymerizes the lens-forming fluid material;

wherein emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

In accordance with the invention, the ink comprises at least a colorant, a silicone-containing binder polymer.

A solvent can be water, an organic or inorganic solvent, a mixture of several organic solvents, or a mixture of water and one or more water soluble or water miscible organic solvents.

A colorant can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

In accordance with the invention, a silicone-containing binder polymer should comprise crosslinkable groups selected from the group consisting of ethylenically unsaturated groups, hydroxyl —OH, amino —NHR (wherein R is hydrogen or $C_1$ to $C_8$ alkyl), carboxylic acid —COOH, epoxy, amide —CONHR, isocyanate, peroxy, perester, anhydride, alkoxysilane, silanol, acetoxysilane, silanes, halosilane, and combinations thereof. The color coat may or may not contain an adhesion promoter, largely depending on the type of crosslinkable groups of a silicone-containing binder polymer to be used.

Where the silicone-containing bind polymer in an ink comprises ethylenically unsaturated groups as crosslinkable groups, a colored coat printed on the molding surface of a mold can be cured actinically to form a colored film. There is no need for an adhesion promoter. Examples of such silicone-containing binder polymer are ethylenically functionalized derivatives of silicon-containing polymers, as disclosed in commonly assigned U.S. Pat. No. 7,550,519 (herein incorporated by reference in its entirety). The term "ethylenically functionalized" as used herein is intended to describe the introduction of ethylenically unsaturated groups into the silicone-containing polymer. The silicone-containing polymer to be ethylenically functionalized is preferably a copolymerization product of a polymerizable composition, which comprises (a) at least one hydrophilic vinylic monomer, (b) at least one functionalizing vinylic monomer containing at least one pendant functional groups, preferably selected from the group consisting of hydroxyl groups (—OH), primary amino groups (—$NH_2$), secondary amino groups (—NHR), carboxylic groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof, and (c) at least one silicone-containing vinylic monomer or macromer. The polymerizable composition can also include a polymerization initiator (i.e., a photoinitiator or a thermal initiator), a solvent which is preferably the solvent used in an ink, and a chain transfer agent. Ethylenically functionalizing of the silicone-containing polymer is carried out by reacting the silicon-containing polymer with an ethylenically functionalizing agent which comprises an ethylencially unsaturated group and a group capable of reacting with the functional groups of the silicone-containing polymer to form covalent linkages, as known to person skilled in the art. Examples of preferred ethylenically functionalizing agents include, but are not limited to, glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, and methacrylic anhydride.

Where a silicone-containing binder polymer in an ink coat comprises crosslinkable groups selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof, an adhesion promoter may be included in the color coat for further improving color coating adhesion to the silicone hydrogel lens. Examples of such silicone-containing binder polymer are those disclosed in a commonly-assigned as disclosed in commonly assigned U.S. Pat. No. 8,147,728 (herein incorporated by reference in its entirety). Such silicone-containing binder polymer can be a copolymerization product of a polymerizable mixture including: (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; and (iii) at least one silicone-containing vinylic monomer or macromer. one or more components selected from the group consisting of a polymerization initiator (i.e., a photoinitiator or a thermal initiator), a chain transfer agent, and a solvent. The polymerizable mixture can also include a polymerization initiator (i.e., a photoinitiator or a thermal initiator), a solvent which is preferably the solvent used in an ink, and a chain transfer agent. The polymerizable mixture can optionally include a hydrophobic vinylic monomer, for example, such as, 2-ethoxyethylmethacrylate (EOEMA).

Examples of siloxane-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris (pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy)silane, and represented by CAS No. 17096-07-0. The term "TRIS" also includes dimers of 3-methacryloxypropyltris(trimethylsiloxy)silane.

Any know suitable siloxane-containing macromer can be used. A particularly preferred siloxane-containing macromer is selected from the group consisting of Macromer A, Macromer B, Macromer C, and Macromer D described in U.S. Pat. No. 5,760,100, herein incorporated by reference in its entirety.

Nearly any hydrophilic vinylic monomer can be used in the invention. Suitable hydrophilic monomers are, without this being an exhaustive list, hydroxyl-substituted lower alkyl($C_1$ to $C_8$)acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like. Among the preferred hydrophilic vinylic monomers are N,N-dimethylacrylamide (DMA), 2-hydroxyethylmethacrylate (HEMA), hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1-dimethyl-3-oxobutyl)acrylamide, acrylic acid, and methacrylic acid.

Any know suitable vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof can be used as functionalizing vinylic monomer in the present invention. Preferred examples of such vinylic monomers includes methacrylic acid (MAA), acrylic acid, glycidylmethacrylate, glycidylacrylate, HEMA, HEA, and N-hydroxymethylacrylamide (NHMA).

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of functional groups (e.g., DMA, NVP).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

In accordance with the invention, copolymerization reaction for preparing a binder polymer can be initiated by heat or actinic radiation (e.g., UV) in a polymerizable mixture which includes a solvent (e.g, ethanol or cyclopentanone), a thermal initiator (e.g., AIBN) or a photoinitiator, a chain transfer agent (e.g., ethyl mercaptan (EtSH)), a hydrophilic vinylic monomer devoid of functional groups (e.g. DMA), a functionalizing vinylic monomer having at least one functional groups (e.g. HEMA, MAA, or glycidylmethacrylate), an alkoxysilane monomer (e.g. TRIS), and monomethacrylated polydimethylsiloxane. It might be preferable the polymerization reaction is not complete, thereby producing a binder polymer dissolved in a solvent which preferably contains some residual unreacted vinylic monomers. Polymerization mixtures that contain only binder and unconverted monomer might also be desirable since solvent would be eliminated. The unconverted monomer can be used to help control rheological properties of inks and be converted to polymer during ink cure and/or bonnet curing. A person skilled in the art will know well how to control polymerization level.

In accordance with the invention, an ink can also comprise one or more components selected from the group consisting of a thermal initiator, a photoinitiator, a diluent, a surfactant, a humectant, an antimicrobial agent, an antioxidant agent, an anti-coagulating agent, and other additives known in the art.

In accordance with the invention, a diluent can be a solvent or a solution of one or more vinylic monomers.

An ink used in the invention should have a good adhesion to a silicone hydrogel contact lens. As used herein, "good adhesion to a contact lens or a silicon hydrogel contact lens" in reference to a colored coat or an ink means that the colored coat (with a color image) generated on the lens with the ink can pass a mechanical rubbing test, The mechanical rubbing test for assessments of ink adhesion. The mechanical rubbing test is made by evaluating test specimen cloths that are generated by placing a hydrated lens between layers of the cloth and applying a mechanical stress to the cloth. Two methods of applying mechanical stress are:
1) Compression of the cloth-lens assembly between two fixed rollers
2) Application of stress to the cloth-lens assembly using a commercially available devise designed for abrasive wear testing (Taber® Linear Abraser Model 5750, Taber Industries, Inc.)

Visible and microscopic (~10×) observation of colorant bleeding, smearing, or delamination indicates failure of the rub test.

In accordance with the invention, an ink can be applied to a molding surface of a mold according to any printing technologies, such as, for example, pad transfer printing (or pad printing), or inkjet printing. It is understood that other types of printing technologies could also be used to print molds.

In accordance with the present invention, a lens-forming fluid material can be a solution or a solvent-free liquid or melt at a temperature below 60° C.

In accordance with the present invention, a lens-forming fluid material can be any formulations for making soft contact lenses. Exemplary formulations include without limitation the formulation of lotrafilcon A, lotrafilcon B, etafilcon A, genfilcon A, lenefilcon A, polymacon, acquafilcon A, and balafilcon.

Where a lens-forming fluid material is a solution, it can be prepared by dissolving at least one silicone-containing vinylic monomer or macromer and at least one hydrophilic vinylic monomer and all other desired components in any suitable solvent known to a person skilled in the art, for example, including those described above.

In accordance with the present invention, any know suitable silicone-containing macromer, such as, for example those disclosed above, can be used to prepare soft contact lenses. Any known suitable silicone-containing vinylic monomers, such as, for example, those described above, can be used to prepare soft contact lenses.

Examples of suitable hydrophilic monomers are those described above.

In accordance with the present invention, a lens-forming material can further comprise various components, such as cross-linking agents, hydrophobic vinylic monomers, initiator, UV-absorbers, inhibitors, fillers, visibility tinting agents, antimicrobial agents, and the like.

In accordance with the invention, at least one color coat is applied to at least a portion of at least one of the female molding surface and the male molding surface with an ink, wherein the ink comprises at least one colorant and a silicone-containing polymer binder. The color coat can be applied to a molding surface of a mold according to any printing technologies, such as, for example, pad transfer printing (or pad printing), or inkjet printing. It is understood that other types of printing technologies could also be used to print molds. The color may contain certain patterns as illustrated in the U.S. Pat. No. 6,827,440 (herein incorporated by reference in its entirety).

In pad-transfer printing, a color image is placed or printed on a pad transfer device and the image on the pad transfer device is transferred to another surface, such as a polymer or lens (U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

In accordance with the invention, at least one clear coat could be applied to at least a portion of at least one of the female molding surface and the male molding surface with an ink, wherein the ink comprises a silicone-containing polymer binder but the ink has no colorant. The clear coat is applied to the mold surface before the color coat is applied to the mold surface. However, the clear coat can be applied to the mold surface after the color coat or color coats are applied to the mold surface.

In accordance with the invention, the color coat on the molding surface is irradiated with a first high intensity UV light to at least partially cure the color coat. In accordance with the present invention, the first intensity UV light has a relatively high intensity of UVA/UVB to provide energy for initiation of free radical reactions through the printed ink pattern. For example, the first UV illumination is accomplished by using a high intensity lamp system with a D bulb, such as a Fusion Systems Inc. model F300 with a model T300 MB irradiator and a D UV source or a Fusion Systems Inc. model VPS6 with a model 1250 irradiator and a D bulb UV source.

In still another embodiment, the UV intensity of the first high intensity UV light may have approximate values of about 20-60 mW/cm$^2$, more preferred range of 30-40 mW/cm$^2$ at a wavelength range of about 250-260 nm. At a wavelength range of about 320-390 nm, the UV intensity may have approximate values of about 500-1250 mW/cm$^2$, more preferred range is 600-800 mW/cm$^2$, even more preferred range is 650-750 mW/cm$^2$. The irradiation step uses the first high intensity UV light with an exposure time on the order of 1.0-10 second(s). More preferably, the exposure time is contemplated to last 2.0-7.0 second(s). More preferably still, the exposure time is contemplated to last 3.0-5.0 second(s). At a wavelength range of about 320-390 nm, the UV energy applied may have approximate values of about 300-800 mJ/cm$^2$, more preferred range is 400-700 mJ/cm$^2$, and even more preferred range is 550 to 650 mJ/cm$^2$ using the F300 system.

In accordance with the present invention, a possible setup of the system for the first high intensity UV light is shown in US2008/0150178 A1, which is incorporation herein by reference in its entirety.

In accordance with the present invention, characterization and monitoring of the UV source and optical system requires radiometric measurements. Radiometers appropriate to the high intensities described in this disclosure may include the EIT Inc model UV PowerMAPT™ four channel radiometer in the high power configuration or the EIT Inc. model 3DCURE™ radiometer system with the high sampling rate option.

In accordance with the present invention, colored contact lenses may be produced by double-sided molding (DSM) processes. These processes typically involve dispensing a fluid material into a female mold half, mating a male mold half to the female, and applying ultraviolet radiation to polymerize the monomers. For example exposed to UV light at a wavelength range of about 320-390 nm, the UV intensity applied may have approximate values of about 4-8 mW/cm$^2$ for 5-7 minutes. Such molds may be injection molded or produced in any other feasible way known in the art. The female mold half may have a molding surface with optical quality that defines the anterior (front) surface of a contact lens. The male mold half may have a molding surface with optical quality that defines the posterior (back) surface of the lens. The polymerized lens removed from the molds in a DSM process does not usually require surface polishing, but subsequent extraction of unreacted monomer or solvent is commonly required.

An improvement of the DSM process is described in U.S. Pat. No. 6,113,817. This improvement may be semi-cyclic and preferably includes the steps of (a) dispensing crosslinkable and/or polymerizable material into a female mold half, (b) mating a male mold half to a female mold half to create a lens cavity; (c) applying radiation to crosslink and/or polymerize the crosslinkable and/or polymerizable material to form a lens; (d) separating the male mold half from the female mold half; (e) washing the mold halves and lens to remove unreacted crosslinkable and/or polymerizable material; (f) ensuring the lens is adjacent a selected mold half (e.g., the female mold half); (g) centering the lens within the selected mold half; (h) grasping the lens (e.g., in a central area) to remove the lens from the mold half; (i) at least partially drying the lens to remove surface water which may impair inspection of the lens; (j) inspecting the lens; (k) depositing an acceptable lens into packaging; (l) cleaning the male and female mold halves; and (m) indexing the male and female mold halves to a position for dispensing crosslinkable and/or polymerizable material. This semi-continuous, partially cyclic molding process reuses or recycles the mold halves used to retain the fluid optical material and give the lens its shape.

The semi-continuous, partially cyclic molding process may be operated with a single mold cycling through the process or a plurality of molds arranged and aligned in a molding carrier in order to improve process efficiency. The molds may include disposable molds, such as polypropylene molds or quartz and brass molds that are reused. The mold halves may be formed from a number of materials, at least one of which transmits the desired radiation for crosslinking and/or polymerization, preferably in the ultraviolet range. Examples of contemplated suitable mold materials include polypropylene, PMMA, polycarbonate, Zenex, Zenor, OPI Resin by Hitachi, TOPAS®, polystyrene, polypropylene and poly(acrylonitriles) such as BAREX. Molds are typically used in the manufacturing process immediately after they are created to achieve optimal performance; however, in some cases immediate use is not possible due to manufacturing constraints. The temperature and conditions of these molds is important as the mold shapes the final lens. Defects in the mold may propogate, causing defects in the lenses.

In some manufacturing techniques, molds may be created off-line by injection molding. Front curve and back curve molds may be produced simultaneously or in parallel tracks to produce front curve and back curve molds of essentially the same age. In some embodiments, these molds may be stacked in paired units. In an embodiment in which paired units are utilized, the molds may be used in a last-in, first-out method, which means that the molds may not be used immediately and that some molds may be exposed to ambient air for extended periods of time.

If prior to assembly, the mold halves are exposed to oxygen, the polymerization process may be inhibited to such an extent that the contact lenses will not have the desired physical properties. It is suspected that this is due to the $O_2$ being adsorbed onto and absorbed into the plastic mold halves, which may adversely affect the polymerization of the lens material. The effect of $O_2$ on the photopolymerization process is that it strongly inhibits radical-induced polymerization. Polymerization is suppressed until $O_2$ has been consumed by reaction with radicals until the monomer (or macromer i.e. betacon macromer cross linking could be inhibited) is able to compete successfully with $O_2$ for initiator radicals.

Exposing mold halves to $O_2$ before assembly of the mold halves leads to a "closed-open" system during polymerization. When the system is open, $O_2$ absorbs onto the surface and absorbs into the mold, thus creating an $O_2$ reservoir. When the mold is assembled (closed), after the induction period when $O_2$ in the monomer and on and in the mold halves is consumed, polymerization proceeds in the lens bulk. The effect on lens properties is dependent on the amount of $O_2$ absorbed into the mold prior to assembly.

The effect of $O_2$ absorbed onto and into the mold on photopolymerization of the reaction mixture is expected to disrupt polymerization at the lens surface, i.e. to cause differential polymerization at the lens surface relative to the lens bulk. This disruption causes more loose polymer ends at the surface due to (premature) termination of polymerization by $O_2$. These shorter chain polymers at the surface of the lens tend to have lower cross link density, less chain entanglement, and more tackiness than the polymer chains in the bulk of the lens. These factors result in a material property gradient from the lens surface to the lens bulk.

To reduce the deleterious effect of $O_2$, contact lens manufacture may be carried out in a reduced $O_2$ environment, and/or the reaction mixture is treated to remove dissolved $O_2$ prior to polymerization. In manufacturing, this has resulted in the use of techniques such as physical enclosure of the process and use of large quantities of nitrogen to blanket the assembly and pre-assembly areas. This technique includes the plastic mold halves within the blanketed area since the boundary layer of gases on the plastic surfaces will include $O_2$ if not so protected. Typically, the percent $O_2$ in the atmosphere surrounding the plastic molds halves is monitored and kept below 0.5 percent, the other 99.5 percent of the atmosphere is the inert gas. For example, see U.S. Pat. No. 5,555,504.

The prior art discloses that the amount of oxygen exposure must be limited or avoided to prevent the deleterious effects that the exposure to oxygen has on the manufacture of contact lenses. Various techniques for reducing the deleterious effects of $O_2$ on the polymerization of contact lenses are found in the following U.S. Pat. No. 5,362,767 Herbrechtmeier, et al U.S. Pat. No. 5,391,589 Kiguchi, et al U.S. Pat. No. 5,597,519 Martin, et al U.S. Pat. No. 5,656,210 Hill, et al U.S. Pat. No. 5,681,510 Valint, Jr., et al. EP Appln. No. 95937446.3 discloses a process in which plastic molds are treated prior to dosing with the reactive monomer mix to remove substantially all of the $O_2$. The removal of the $O_2$ can be accomplished by contacting the mold pieces with an inert gas or by using a vacuum. Molds that were not treated to remove the $O_2$ provided contact lenses with high percentages of defects and with reduced ion permeability.

The present invention provides a method to counteract the adverse effects of oxygen exposure by decoupling the mold creation process from the polymerization of color lenses. This decoupling will allow greater flexibility in when the molds are manufactured and used in relation to the polymerization process.

In one embodiment of the present invention, this is accomplished by exposing both male and female molds to the second high intensity UV light immediately prior to the polymerization process of the lens. However, in order to obtain a high-quality color print image on the lens, the time between the mold exposing to the second high intensity UV light and ink printing on the mold/at least partially curing with the first high intensity UV light preferred occurs between 0.5 to 96 hours, preferably between 18 to 48 hours, more preferably between 20 to 26 hours.

In accordance with the present invention, the second high intensity UV illumination has a relatively high intensity of UVC is to provide the energy at the surface for the reactions that lead to the enhancement of final lens ion permeability. For example, the second high intensity UV illumination is accomplished by using a high intensity lamp system with an H+ bulb, such as a Fusion Systems Inc. model F300 with a model T300 MB irradiator and an H+ UV source or a Fusion Systems Inc. model VPS6 with a model 1250 irradiator and an H+ UV source The second high intensity UV may have approximate intensity values of about 150-600 mW/cm$^2$, more preferred range about 240-480 mW/cm$^2$ at a wavelength range of about 320-390 nm. At a wavelength range of about 250-260 nm, the second high intensity UV may have approximate intensity values of about 45-125 mW/cm$^2$, more preferred range is 52 to 95 mW/cm$^2$. The irradiation step uses the second high intensity UV light with an exposure time on the order of 0.1-20 second(s). More preferably, the exposure time is contemplated to last 0.5-10 second(s). More preferably still, the exposure time is contemplated to last 1.0-5.0 second(s). Most preferably, the exposure time is contemplated to last 1.0-2.0 second (s). At a wavelength range of about 250-260 nm, the UV energy applied may have approximate values of about 15-100 mJ/cm$^2$, more preferred range is 20-85 mJ/cm$^2$, and even more preferred range is 25 to 75 mJ/cm$^2$ using the F300 system.

In accordance with the present invention, emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

In accordance with the present invention, a possible setup of the system for the second high intensity UV light is shown in US2008/0150178 A1, which is incorporation herein by reference in its entirety.

In accordance with the present invention, characterization and monitoring of the UV source and optical system requires radiometric measurements. Radiometers appropriate to the high intensities described in this disclosure may include the EIT Inc model UV PowerMAPT™ four channel radiometer in the high power configuration or the EIT Inc. model 3DCURE™ radiometer system with the high sampling rate option.

In accordance with the present invention, a lens-forming fluid material comprising at least one silicone-containing vinylic monomer or macromer and at least one hydrophilic vinylic monomer is filled into the irradiated mold assembly from step d), and then curing of a lens-forming material can be initiated with an energy source (thermally or actinically). For example a lens-forming material is exposed to UV light at a wavelength range of about 320-390 nm, the UV intensity applied may have approximate values of about 4-8 mW/cm$^2$ for 5-7 minutes.

The above describes the way to manufacture a silicone-hydrogel contact lenses high ion permeability with irradiating the exposed surfaces of the female mold and the male mold with a second high intensity UV light prior to fill a lens-forming fluid material comprising at least one silicone-containing vinylic monomer or macromer and at least one hydrophilic vinylic monomer into the irradiated mold assembly. There is a new challenge to manufacture silicone-hydrogel contact lenses high ion permeability and a high-quality color image.

In accordance with the present invention, a high-quality color image refers to the color image has good adhesion to a contact lens or a silicon hydrogel contact lens and the color image has no smudging, no smearing and no delamination.

Smudging refers to deterioration in print quality due to loss of pattern shape and definition/crispness. The dots of the pattern starts loosing their round shape and the inks bleed into the lens formulation. It is a sign of under-cured inks Smearing refers to deterioration in print quality due to shearing of lens formulation on cured inks during the closing of the two molds halves. The print pattern looks like has been treated with a brush. It is a sign of under-cured ink.

Deterioration in print quality refers to that ink dots lose their shape and merge into each other resulting in a more intense color and in a "tile" pattern. It is a sign of over-cured ink.

The present invention discovers that using only one high intensity UV exposure (the H+ bulb) resulted in color coat not completely cured and a final print quality non acceptable. The results indicate that the following method of making colored silicone hydrogel contact lenses will not result in a high-quality color image.

The above method fails because the color coat is not cured enough, when the molds are filled with lens-forming fluid material, the latest penetrated into the color coat layers and spread them over the mold, losing the pattern definition (smearing and smudging). This happens because the color coat network is too soft being undercured.

The present invention also discovers that using two same high intensity UV of 250-260 nm (the H+ bulb) exposures resulted in color coat overcured and a final print quality non acceptable.

The above method fails because the color coat is overcured, the color coat becomes too rigid and the ink dots delaminate when the lens-forming material is added and lens is cure. Delamination looks like the color coat platetes floating on top of the lens.

The present invention further discovers that using two same high intensity UV of 320-390 nm (the D bulb) exposures resulted in color contact lens having an ion permeability non acceptable.

The above method fails because D bulb delivers not enough UV intensity in the wavelength from 250-260 nm to destroy the surface inhibited layer in order to enhance ion permeability.

The present invention further discovers that using two different high intensity UV exposures [the D+ bulb having high intensity UV of 320-390 nm for curing the color coat and H+ bulb having high intensity UV 250-260 nm for irradiating the exposed surfaces of the female mold and the male mold] result in a final print quality acceptable and high ion permeability.

The results indicate that the following method of making colored silicone hydrogel contact lenses will result in a high-quality color image. The method of making colored silicone-hydrogel contact lenses comprises the steps of:
a) providing a mold assembly comprising a female mold half having a molding surface and a male mold half having a molding surface;
b) applying at least one color coat to at least a portion of at least one of the female molding surface and the male molding surface with an ink, wherein the ink comprises at least one colorant and a silicone-containing polymer binder;
c) irradiating the color coat on the molding surface with a first high intensity UV light to at least partially cure the color coat; and then
d) irradiating the exposed surfaces of the female mold and the male mold with a second high intensity UV light prior to;
e) filling a lens-forming fluid material comprising at least one silicone-containing vinylic monomer or macromer and at least one hydrophilic vinylic monomer into the irradiated mold assembly from step d);
f) exposing the mold assembly and the lens-forming fluid material to an energy source,
wherein the energy source polymerizes the lens-forming fluid material; wherein emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

The above method works because the D bulb has low level of UVC. UVC exposure can lead to undesired free radical reactions and they can cause damage to the chemical structure of the binder contained in the color coat and break chemical bonds. The right combination of D bulb exposure and H+ bulb exposure allows a lens that maintains good ion permeability (IP) value and an optimal print quality.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

Example 1

This example describes synthesis of a photo-curable binder polymer

TABLE 1

| Components | Formulation (% by weight) |
|---|---|
| DMA | 38.53 |
| VAZO-52 | 0.60 |
| TRIS-methacrylate | 24.49 |
| Betacon macromer | 21.47 |
| HEMA | 10.10 |
| 2-mercaptoethanol | 1.38 |
| IEM | 3.43 |

IEM = 2-isocyanatoethylmethacrylate

Two-step binder synthesis is described as below:
Step 1—Copolymerization
All reactants (minus IEM) area reacted together at 50° for 24 hours in ethyl acetate; 2-mercaptoethanol controls the viscosity build up.
4-hydroxy TEMPO is added at 100 ppm to scavenge any radicals created in the remaining synthetic process.
Step 2—Functionalization to Macromer
IEM and catalyst (dibutyltin dilaurate) are added to functionalize the copolymer; this reaction is at 40° for 4 hours.

Finishing

The product is solvent exchanged to 1-propanol by evaporating off ethyl acetate.

Macromer ("binder polymer") is then incorporated into ink formulation.

Example 2

This example describes preparation of an ink formulation

| Components | Formulation (% by weight) |
|---|---|
| Binder from example 1 | 38 |
| Darocure 4265 | 2.0 |
| pigments | Varies by colors/5-10% |
| Solvent/ethanol | To 100 |

Base curve portion (male mold halves) of polypropylene molds are pad printed with a combination of three inks (three patterns, one different color per pattern, same ink formulation, different only for type and quantity of pigments). The printed mold is exposed to first high intensity UV (Fusion D bulb) for about 4 second.

Both male mold and female mold are exposed to second high intensity UV (Fusion H+ bulb) for about 1.5 second. There is a 24 hours time delay between the first high intensity UV treatment and second high intensity UV treatment.

The front curve portion (male mold halves) is then filled with about 75 microliters of lotrafilcon B formulation. The mold halves (printed/cured male and filled femal) are combined and closed. The molds are then placed under UV lamp (double side) for about 6 minutes at 4-8 mW/cm². After curing, lenses are demolded, extracted in isopropanol for 1 hour, and then re-equilibrated in Phosphate buffered saline (PBS). Print quality smearing/smudging/delamination) is evaluated at high magnification. Lens with presence of smearing or smudging or delamination are considered not cosmetically acceptable. The resulted lens has an ion permeability of $5.5-6 \times 10^{-6}$ mm²/min.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A method of making colored silicone-hydrogel contact lenses, comprising the steps of:
   (a) providing a mold assembly comprising a female mold half having a molding surface and a male mold half having a molding surface;
   (b) applying at least one color coat to at least a portion of at least one of the female molding surface and the male molding surface with an ink, wherein the ink comprises at least one colorant and a silicone-containing polymer binder;
   (c) irradiating the color coat on the molding surface with a first high intensity UV light to at least partially cure the color coat; and then
   (d) irradiating exposed surfaces of the female mold and the male mold with a second high intensity UV light prior to step (e);
   (e) filling a lens-forming fluid material comprising at least one silicone-containing vinylic monomer or macromer and at least one hydrophilic vinylic monomer into the irradiated mold assembly from step d);
   (f) exposing the mold assembly and the lens-forming fluid material to an energy source, wherein the energy source polymerizes the lens-forming fluid material;
   wherein an emission spectrum of the first high intensity UV light has a higher intensity in wavelength range of 320-390 nm by at least 200 mW/cm² and a lower intensity in wavelength range of 250-260 nm by at least 10 mW/cm² than the second high intensity UV light.

2. The method of claim 1, wherein the intensity of the first high intensity UV light is about 650-750 mW/cm² at a wavelength range of about 320-390 nm, and about 35-45 mW/cm² at a wavelength of about 250-260 nm.

3. The method of claim 1, wherein the first high intensity UV light irradiates the molding surface having the color coat for about from 1 to 25 seconds.

4. The method of claim 1, wherein the first high intensity UV light irradiates the molding surface having the color coat for about from 2 to 10 seconds.

5. The method of claim 1, wherein the intensity of the second high intensity UV light is about 150-600 mW/cm² at a wavelength range of about 320-390 nm, and about 45-125 mW/cm² at a wavelength of about 250-260 nm.

6. The method of claim 5, wherein the second high intensity UV light irradiates the exposed surfaces of the female mold and the male mold for about from 0.1 to 20 seconds.

7. The method of claim 6, wherein the second high intensity UV light irradiates the exposed surfaces of the female mold and the male mold for about from 0.5 to 5 seconds.

8. The method of claim 1, wherein an energy of the first high intensity UV light is about 400-800 mJ/cm² at a wavelength range of about 320-390 nm.

9. The method of claim 8, wherein the energy of the second high intensity UV light is about 15-75 mJ/cm² at a wavelength range of about 250-260 nm.

10. The method of claim 1, wherein the time between step (c) and (d) is between 0.5 to 96 hours in order to obtain a high-quality color print image on the lens.

11. The method of claim 1, wherein the time between step (c) and (d) is between 20 to 26 hours in order to obtain a high-quality color print image on the lens.

12. The method of claim 1, wherein the time between step (c) and (d) is between 2 to 4 hours in order to obtain a high-quality color print image on the lens.

* * * * *